United States Patent [19]
Yu

[11] Patent Number: 5,010,139
[45] Date of Patent: Apr. 23, 1991

[54] COPOLYMERS OF ETHYLENE OXIDE AS ANTISTATIC ADDITIVES

[75] Inventor: Simon H. P. Yu, Westlake, Ohio

[73] Assignee: The B. F. Goodrich Company, Akron, Ohio

[21] Appl. No.: 366,330

[22] Filed: Jun. 14, 1989

Related U.S. Application Data

[63] Continuation of Ser. No. 7,039,258, Apr. 17, 1987, abandoned.

[51] Int. Cl.$^5$ .................. C08K 5/15; C08L 9/02; C08L 13/00; C08L 69/00
[52] U.S. Cl. ...................... 525/187; 524/397; 524/910; 525/396; 525/403; 525/405; 525/408; 525/409
[58] Field of Search ............ 525/187, 64, 403, 424, 525/349, 391, 398, 405, 407, 408, 437, 462, 396, 409; 524/910, 343, 349, 397,

[56] References Cited

U.S. PATENT DOCUMENTS

| | | |
|---|---|---|
| 1,109,901 | 2/1955 | Stewart et al. |
| 3,425,981 | 2/1969 | Puletti et al. .................. 525/187 |
| 3,876,725 | 4/1975 | Wells et al. .................. 524/343 |
| 3,882,190 | 5/1975 | Wells .................. 524/349 |
| 3,887,644 | 6/1975 | Wells .................. 524/349 |
| 3,923,924 | 12/1975 | Wells et al. .................. 525/423 |
| 4,051,196 | 9/1977 | Wells et al. .................. 525/424 |
| 4,069,277 | 1/1978 | Mathis et al. .................. 524/910 |
| 4,165,303 | 8/1979 | Schlossman et al. .................. 524/910 |
| 4,230,827 | 10/1980 | Myers .................. 528/103 |
| 4,291,134 | 9/1981 | Hambrecht et al. .................. 525/187 |
| 4,379,913 | 4/1983 | Waitkas .................. 524/910 |
| 4,440,898 | 4/1984 | Pomplon et al. .................. 525/187 |
| 4,543,390 | 9/1985 | Tanaka et al. .................. 525/187 |
| 4,588,773 | 5/1986 | Federl et al. .................. 525/187 |

FOREIGN PATENT DOCUMENTS 1109901 2/1956 Fed. Rep. of Germany .

Primary Examiner—Allan M. Lieberman
Attorney, Agent, or Firm—Konrad H. Kaeding

[57] ABSTRACT

An antistatic polymeric composition consisting of at least one antistatic additive of an ethylene oxide copolymer in the range of from about 3% to about 30% by weight and being a solid, nonionic material and having a dilution solution viscosity of greater than 0.25 g/ml and preferably having an average molecular weight greater than 20,000; and a polymeric material in the range from about 70% to about 97% by weight. The ethylene oxide copolymer comprises ethylene oxide in the range of from about 5% to about 95% by weight and at least 1 comonomer selected the group consisting of cyclic ethers, cyclic acetals, and cyclic esters, in the range of from about 95% to about 5% by weight. The polymeric material can be any thermoplastic, thermoplastic elastomer, or elastomer including ABS, ASA, polyamides, PBT, PET, PETG, PMMA, PUR, PVC, CPVC, PC, POM, POP, SMA, and SAN.

6 Claims, No Drawings

COPOLYMERS OF ETHYLENE OXIDE AS ANTISTATIC ADDITIVES

This is a continuation of co-pending U.S. application Ser. No. 07/039,258 filed on April 17, 1987, now abandoned.

BACKGROUND OF THE INVENTION

1. Field of the Invention

The present invention relates to a new class Of antistatic additives based on solid copolymers of ethylene oxide having a high molecular weight. When used with plastics as an antistatic additive, the ethylene oxide copolymers do not significantly impair the physical properties of the plastic. The ethylene oxide copolymers are also stable at high processing temperatures and do not cause blooming of the finished product (oiliness, crazing, marblizing, and cracking). The present invention also relates to a method for treating polymeric materials with ethylene oxide copolymers to produce antistatic materials.

2. Prior Art

The retention and amplification of charges of static electricity on the surface of most plastics is well known. Plastic materials have a significant tendency to accumulate static electrical charges due to low electrical conductivity. A sudden discharge of static electrical charges in the form an electric arc is a fire hazard and exposes personnel handling the processed plastic to electrical shock. Furthermore, the presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal.

The increasing complexity and sensitivity of microelectronic devices makes the control of electrostatic discharge (ESD) of particular concern to the electronic industry. Only a few hundred volts can cause damage to sensitive devices and result in disappointing manufacturing yields, erratic errors, transient malfunctions, erased memory, etc. The need to control ESD requires the total assembly environment to be constructed of partially conductive materials. It also requires electrostatic protective packages, tote boxes, easings, and covers to store, ship, protect, or support electrical devices and equipment made from polymeric materials possessing antistatic properties. Additionally, accumulation of static electrical charges on electrical equipment like computers or vacuum cleaners or on finished goods such as carpet can cause the electrical equipment to fail or cause carpet to transfer accumulated static charges to the user during periods of low humidity.

To prevent static electrical charges from accumulating during manufacturing of the plastic, during forming of articles of manufacture, and during the useful life of the various articles of manufacture, it is well known to employ various types of antistatic agents. The antistatic agents can take the form of a coating which may be sprayed upon the manufactured sheets of plastic or the article of manufacture, for example, but this solution is often temporary.

Other attempts to overcome the static charges call for incorporating an antistatic agent into the plastic during processing in order to provide a more "permanent" antistatic characteristic to the manufactured plastic, articles of manufacture made from the plastic, etc.. However, the incorporation of antistatic agents into the various types of plastics have created other problems. For example, a majority of the antistatic agents cannot withstand high temperatures and they are destroyed or rendered useless with respect to their antistatic abilities during the hot temperature processing required in conventional molding or fabricating steps for forming articles of manufacture. This limits their applications to low-melting plastics, such as low density polyethylenes.

A majority of the antistatic agents are also either cationic or anionic. They tend to cause the degradation of plastics, particularly PVC and polyacetals, at hot processing temperatures resulting in discoloration or loss of physical properties. Other antistatic agents have significantly lower molecular weights than the polymers themselves. Generally, lower molecular weight antistatic agents possess undesirable lubricating properties and are difficult to incorporate into the polymer. Incorporation of the lower molecular weight antistatic agents into the polymers often reduce the moldability of the plastic because the antistatic agents bleed through to the surface of the plastic and frequently deposit a coating on the surface of the molds, thus destroying the surface finish on the articles of manufacture and reduce the dimensional stability when exposed to heat. In severe cases, the surface of the article of manufacture becomes quite oily and marblized. This is called blooming. Additionally, the lower molecular weight antistatic agents often tend to lose their antistatic capability due to evaporation, develop undesirable odors, and promote cracking or crazing on the surface of the article of manufacture.

One of the known lower molecular weight antistatic agents is a homopolymer or copolymer of ethylene oxide. Generally, the lower molecular weight polymers of ethylene oxide antistatic agents are subject to the above mentioned problems relative to lubricity, blooming, or less effective antistatic properties. Exemplary of the lower molecular weight antistatic agents comprising a homopolymer of ethylene oxide are Carbowax ® by Union Carbide; Polyglycol ® E by Dow Chemical, Pluracol ®·E by BASF Wyandotte, and U.S. Pat. Nos. 4,274,986; 3,745,116; and 3,625,915. Exemplary of the lower molecular weight antistatic agents comprising a block copolymer of ethylene oxide and propylene oxide are: Pluronic ® by BASF Wyandotte; Voranol ® by Dow Chemical; U.S. Pat. No. 3,686,120; Japanese Patents 49-23,246; 48-66,648; and 47-8,776; and German Patents 2,214,219 and 2,127,654. Exemplary of lower molecular weight antistatic agent comprising a random copolymer of ethylene oxide and propylene oxide are: Ucon ® by Union Carbide; and U.S. Pat. No. 3,686,120 which is directed to external surface treatment.

Prior to the present invention, conventional thinking was that high molecular weight copolymers of ethylene oxide would significantly impair the physical properties of the plastic. Moreover, prior thinking was that a high molecular weight antistatic agent does not have good antistatic qualities and characteristics. In fact, prior art indicates that a molecular weight above about 20,000 to 25,000 is definitely undesirable. Exemplary of such prior art are U.S. Pat. Nos. 3,686,120 and 4,274,986.

The art of use high molecular weight ethylene oxide homopolymers have been described in U.K. Patent Application 2,139,230 and Japanese Patent 60-206,856. However, high molecular weight ethylene oxide homopolymers are difficult to incorporate into other polymeric materials probably due to the high crystallinity of homopolymers. Furthermore, homopolymers are uneffective antistatic agents when incorporated into polymeric materials at small amounts. When larger amounts of homopolymers are incorporated, the antistatic properties of polymeric materials are slightly improved, but the materials become extremely brittle.

The use of high molecular weight ethylene oxide polymers, including copolymers, for olefin polymers as antistatic additives has been disclosed in U.S. Pat. No. 3,425,981 to Puletti and Gardner. Poly(ethylene oxide) homopolymer is the preferred antistatic agent. The patent discloses that the antistatic agent is incorporated only into olefin polymer compositions. The patent fails to indicate the significant advantages of copolymers over homopolymers of ethylene oxide. Furthermore, the patent also fails to indicate the wide applications of antistatic copolymers to a variety of polymeric materials. The copolymers of ethylene oxide of this invention fail to show significant antistatic improvement when applied to any olefin polymer compositions such as polyethylene. When a copolymer of this invention comprising 85 weight percent of ethylene oxide and 15 weight percent of propylene oxide was incorporated at 10 weight parts per 100 weight parts of polyethylene, both low density polyethylene (Escorne ® LD 405-49 from Exxon) and high density polyethylene (Amoco 3250B from Amoco) gave a surface resistivity great than $10^{16}$ ohm/sq, which is classified as an insulator. According to the teaching of U.S. Pat. No. 3,425,981, the copolymers of ethylene oxide of the present invention will be useless as antistatic additives.

Various copolymers of ethylene oxide having a high molecular weight are taught by the prior art. For example, German Patent 1,109,901 discloses a copolymer of ethylene oxide and propylene oxide which is formed by contacting the monomers with a coordination catalyst based on triethylaluminum (TEAL). Although the German patent does not disclose that these high molecular weight compounds can be used as antistatic agents, it does mention that the high molecular weight compounds can be utilized as thickeners and as a film base.

It is an objective of the present invention to provide an antistatic agent which is a solid, nonionic material preferably having a high molecular weight (greater than 20,000),-having a DSV of greater than 0.25,grams per millileter (g/ml) as determined on a solution made up with 0.25 grams of the polymer in 100 grams of toluene according to ASTM D2857, stable at high temperatures, inert toward and compatible with plastics, and yet do not cause blooming, do not develop undesirable odors, do not significantly impair physical properties and produces a "permanent" antistatic material with a surface resistivity in the order $10^{10}$ to $10^{13}$ ohms per square depending on the amount of antistat incorporated.

It is another objective of the present invention to produce a wide variety of antistatic polymeric materials incorporated in the ethylene oxide copolymers of this invention to minimize the problems caused by static electricity without impairing the physical properties or stability thereof.

It is another objective of the present invention to provide a process for treating a wide variety of polymeric materials with the ethylene oxide copolymers of this invention to produce antistatic polymeric materials.

These and other objectives and advantages of the invention will become apparent by reference to the following description.

SUMMARY OF THE INVENTION

The present invention concerns a solid, nonionic, high molecular weight copolymer of ethylene oxide employed as an antistatic agent in various plastic compounds. In particular, the present invention concerns the combination of a high molecular weight copolymer of ethylene oxide and a polymeric material such as polyvinyl chloride (PVC), terpolymer of acrylonitrile-butadiene-styrene (ABS), chlorinated polyvinyl-chloride (CPVC), polyamides such as nylon 66, for example, polyesters, and polycarbonates.

It is surprisingly found that by adding one or more cyclic comonomers to ethylene oxide, thus forming the high molecular weight copolymers of this invention, significantly improves their antistatic performance. Furthermore, the copolymers are easily incorporated into polymeric material and do not impair the physical properties of polymeric materials significantly. Additionally, the copolymers still maintain the advantages of the nonionic nature of the homopolymers, which are stable at high processing temperatures and do not cause the degradation of the polymeric materials.

The cyclic comonomers of the present invention do not cover the monomer epihalohydrin. This monomer was covered under a separate patent application filed Mar. 20, 1987 as U.S. patent application Ser. No. 06/028,648, now abandoned.

Since the function of antistatic additives is believed to improve the conductivity by absorption of small quantities of moisture at the surface of polymeric material, it is expected that the performance of an antistatic additive should improve as it becomes more hydrophilic. The improvement of antistatic performance by replacing some hydrophilic ethylene oxide units in the homopolymers with hydrophobic units to form copolymers of the present invention is unexpected.

In the broadest sense, the present invention concerns an antistatic polymeric composition having an effective amount of at least one antistatic additive of an ethylene oxide copolymer having a dilution solution viscosity of greater than 0.25 g/ml, the copolymer excluding epihalohydrin and a polymeric material. Preferably the ethylene oxide copolymer is in the range of from about 3 to about 30% by weight; while the polymeric material is in the range of from about 70 to about 97% by weight.

In the broadest sense, the present invention also concerns a process for preparing an antistatic composition by adding to a polymeric material an effective amount of solid antistatic agent consisting of an ethylene oxide copolymer having a dilution solution viscosity of greater than 0.25 g/ml, the copolymer excluding epihalohydrin; and mixing the polymeric material and the ethylene oxide copolymer to produce a uniform antistatic polymeric composition.

DESCRIPTION OF THE PREFERRED EMBODIMENTS

A solid, nonionic copolymer of ethylene oxide which has a high molecular weight is useful as an antistatic agent for various elastomers and plastics. By high molecular weight copolymer, it is meant polymers is a solid at room temperature and having a DSV (dilution solution viscosity) of greater than 0.25 g/ml as determined on a solution made up with 0.25 grams of the polymer in 100 grams of toluene with capillary viscometer at 25° C. according to ASTM D2857, therein referred to as inherent viscosity and preferably having a weight average molecular weight greater than 20,000 as measured by gel permeation chromatography, osmometry, cryoscopy, or ebullioscopy. Low molecular weight polymers referred to in the present application generally is a viscous liquid at room temperature and have a weight average molecular weight less than 20,000 and a DSV less than 0.25 g/ml.

Copolymers of ethylene oxide with one or more cyclic monomers containing up to including 25 carbon atoms per molecule may be suitable antistatic agents. Non-cyclic functional monomers cannot be used because they cannot be copolynerized due to differences in functionality between cyclic and non-cyclic monomers. Copolymers of ethylene oxide may be blocked, graft, random, or alternating copolymers, but preferably random copolymers. The copolymers are high molecular weight with weight average molecular weighs greater than 20,000 and in the range of from about 20,000 to 5,000,000 as measured by gel permeation chromatography, osmometry, cryoscopy, or ebullioscopy, or with a DSV value greater than 0.25 g/ml and in the range of from about 0.25 to 15.0. Preferably, the molecular weight is in the range of from about 25,000 to about 1,000,000, or with a DSV value in the range of from about 0.5 g/ml to 5.0 g/ml. Because of the high molecular weight, copolymers of ethylene oxide of the present invention are solid instead of viscous liquids. Accordingly, the solid copolymers are easily handled, easily use with existing equipment and are easily incorporated into polymeric materials.

In the copolymers of the present invention, the amount of ethylene oxide can vary from about 5 to 95 weight parts, whereas one or more of the comonomers used along with the ethylene oxide can vary in an amount of from about 95 to 5 weight parts. Particularly preferred copolymers consist of 0 to 95 weight parts of ethylene oxide with 60 to 5 weight parts of one or more comonomers all on the basis of 100 weight parts.

The one or more comonomers of the present invention can be alkylene oxide containing up to 25 carbon atoms represented by the formula:

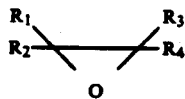

wherein $R_1$, $R_2$, $R_3$, and $R_4$ are selected from the group consisting of hydrogen, saturated aliphatic and cycloaliphatic, monoolefinic aliphatic, and cycloaliphatic, diolefinic (conjugated and non-conjugated) aliphatic and cycloaliphatic, and aromatic, aralkyl, alkaryl and a like. Some or all of the $R_1$, $R_2$, $R_3$, and $R_4$ can be halogen-substituted, excluding epihalohydrin, and can contain oxygen in the form of ether linkages or an ester linkage, or another oxirane group. In addition, both $R_1$ and $R_3$ can represent a divalent aliphatic hydrocarbon radical which, together with the carbon atoms of the oxirane group can form a cycloaliphatic hydrocarbon ring containing from about 4 to about 10 carbon atoms and preferably from 5 to 6 carbon atoms. Finally, at least one of $R_1$, $R_2$, $R_3$, and $R_4$ is not hydrogen.

Exemplary of the alkylene oxides which are represented by the above structural formula and which can be copolymerized with ethylene oxides are:
1,2-epoxypropane(propylene oxide); 1,2-epoxybutane; 2,3-epoxybutane(cis & trans); 1,2-epoxypentane; 2,3-epoxypentane(cis & trans); 1,2-epoxyhexane; 2,3-epoxyhexane(cis & trans); 3,4-epoxyhexane (cis & trans); 1,2-epoxyheptane; 1,2-epoxydecane; 1,2-epoxydodecane; 1,2-epoxyoctadecane; 7-ethyl-2-methyl-1,2-epoxy epoxyundecane; 2,6,8-trimethyl-1,2-epoxynonane; styrene oxide.

Typical alkylene oxide comprising cycloaliphatic hydrocarbon ring represented by the above formula are: cyclohexene oxide; 6-oxabicyclo[3,1,0]-hexane; 7-oxabicyclo[4,1,0]heptane;

Typical halogen-substituted alkylene oxides represented by the above formula are:
3-chloro-1,2-epoxybutane; 3-chloro-2,3-epoxybutane; 3,3-dichloro-1,2-epoxypropane; 3,3,3-trichloro-1,2-epoxypropane;
3-bromo-1-2-epoxybutane;
3-fluoro-1,2-epoxybutane; 3-iodo-1,2-epoxybutane;
1,1-dichloro-1-fluoro-2,3-epoxypropane; 1-chloro-1,1-dichloro-2,3-epxoypropane; and 1,1,1,2-pentachloro-3,4-epoxybutane.

Typical alkylene oxides with at least one ether linkage represented by the formula are exemplified by: ethyl glycidyl ether; n-butyl glycidyl ether; isobutyl glycidyl ether; t-butyl glycidyl ether; n-hexyl glycidyl ether; 2-ethylhexyl glycidyl ether; heptafluoroisopropyl glycidyl ether; phenyl glycidyl ether; 4-methyl phenyl glycidyl ether; benzyl glycidyl ether; 2-phenylethyl glycidyl ether; 1,2-dihydropentafluoroisopropyl glycidyl ether; 1,2-trihydrotetrafluoroisopropyl glycidyl ether; 1,1-dihydrotetrafluoropropyl glycidyl ether; 1,1-dihydrononafluoropentyl glycidyl ether; 1,1-dihydropentadecafluorooctyl glycidyl ether; 1,1-dihydropentadecafluorooctyl-α-methyl glycidyl ether; 1,1-dihydropentadecafluorooctyl-β-methyl glycidyl ether; 1,1-dihydropentadecafluorooctyl-α-ethyl glycidyl ether; 2,2,2-trifluoro ethyl glycidyl ether.

Typical alkylene oxides with at least one ester linkage represented by the formula are: glycidyl acetate; glycidyl chloroacetate; glycidyl butylrate; and glycidyl stearate; to name a few.

Typical unsaturated alkylene oxides represented by the formula are: allyl glycidyl ether; 4-vinylcyclohexyl glycidyl ether; α-terpinyl glycidyl ether; cyclohexenylmethyl glycidyl ether; p-vinylbenzyl glycidyl ether; allylphenyl glycidyl ether; vinyl glycidyl ether; 3,4-epoxy-1-pentene; 4,5-epoxy-2-pentene; 1,2-epoxy-5,9-cyclododecadiene; 3,4-epoxy-1-vinylcyclohexene; 1,2-epoxy-5-cyclooctene; glycidyl acrylate; glycidyl methacrylate; glycidyl crotonate; glycidyl 4-hexenoate.

Preferable alkylene oxides are those in which the $R_2$, $R_3$, and $R_4$ radicals are hydrogen and the $R_1$ radical being saturated aliphatic containing less than two ether linkages. The most preferable alkylene oxide is propylene oxide.

Other cyclic monomers suitable to copolymerize with ethylene oxide are cyclic ethers with four or more member-ring containing up to 25 carbon atoms except tetrahydropyran and its derivatives. Exemplary cyclic ethers with four or more member-ring are oxetane (1,3-epoxide), tetrahydrofuran (1,5-epoxide), and oxepane (1,6-epoxide) and their derivatives.

Other suitable cyclic monomers are cyclic acetals containing up to 25 carbon atoms. Exemplary cyclic acetals are trioxane, dioxolane, 1,3,6,9-tetraoxacycloundecane, trioxepane, troxocane, dioxepane, and their derivatives.

Other suitable cyclic monomers are cyclic esters containing up to 25 carbon atoms. Exemplary cyclic esters are beta-valerolactone, epsilon-caprolactone, zeta-enantholactone, eta-caprylactone, butyrolactone and their derivatives.

Antistatic copolymers of ethylene oxide may be used together with other suitable known antistatic agents including long chain amines, ethers, and esters, amides; salts of quaternary ammonium and sulfonic acids and alkyl, aryl or alkylaryl sulfonates and phosphoric acids; alkyl, aryl, or alkylaryl phosphates; especially their ethoxylate derivatives; and low molecular weight polyether glycols.

Other additives may also be incorporated to improve the performance of the plastics, including fillers, reinforcements, impact modifiers, heat distortion improvers, processing aids, plasticizers, anti-oxidants, thermal stabilizers, pigments, color agents, ultraviolet-light stabilizers, flame retardants, lubricants, slip agents, and blowing agents.

The polymerization process for epoxides in general is already known in the art. Generally, one or more epoxide and the catalyst are contacted in the presence of an inert diluent. Further detailed description of the polymerization process may be found by reference to U.S. Pat. Nos. 3,186,958; 3,640,908; 3,657,159; and 3,135,705.

Any epoxide polymerization catalyst can be used for copolymerization of ethylene oxide to prepare antistatic additives of this invention. Epoxide polymerization catalysts known in the art are anionic catalyst, catalysts based on metal oxides, alkoxides, or carbonates, and coordination catalysts based on an organometallic compound. Among them, coordination catalysts are preferable. Exemplary of coordination catalysts based on an organoaluminum compound which has been modified with water or alcohol or diols, and/or a chelating agent have been described in U.S. Pat. Nos. 3,135,705; 3,135,706; 3,219,591; 3,280,045; 3,058,923; 3,642,667; and 4,460,703; and German Patent 1,109,901.

Exemplary of coordination catalysts based on an organoaluminum compound and a metal salt of a beta-diketone have been described in U.S. Pat. Nos. 3,396,125; 3,457,197; 3,468,860; 3,484,388; 3,506, 597; and 3,925,317.

Exemplary of coordination catalysts based on an organoaluminum compound which has been modified with a phosphoric acid have been described in U.S. Pat. No. 3,770,664 and Japanese Patent 50-124,999.

Exemplary of coordination catalysts based on an organomagnesium compound have been described in U.S. Pat. Nos. 3,766,901; 3,770,655; and 3,450,603.

Exemplary of coordination catalysts based on $\mu$-oxo-bismetallic trinuclear alkoxides have been described in U.S. Pat. Nos. 3,432,445; and 3,657,149.

Exemplary anionic catalysts are potassium hydroxide and sodium hydroxide described in U.S. Pat. Nos. 2,923,690 and 1,976,678; and German Patent 616,428; and British Patent 346,550.

Exemplary catalysts based on metal oxides, alkoxides, and(or) carbonates have been described in U.S. Pat. Nos. 2,866,761 and 3,441,521; and British Patents 793,065 and 799,955.

Copolymerization of the ethylene oxide is carried out using a coordination catalyst system and anhydrous conditions under nitrogen, preferably in an inert diluent. The process may be conducted as a batch or continuous process with a catalyst, monomers, and the inert diluent added simultaneously or in increments during the polymerization, or continuously throughout the polymerization. Ethylene oxide and one or more comonomers are preferably added to the reactor simultaneously or as a mixture, or premixed with the inert diluent before adding the mixture to the reactor, resulting in random copolymers.

Any diluent that is inert under the polymerization conditions can be used, such as for example: toluene; benzene; heptane; hexane; butane; cyclohexane; diethyl ether; chlorobenzene; methylenechloride; and ethylenedichloride. Obviously, any mixture of such diluents can be used and in many case preferable. Depending upon the solubility of the copolymer formed in the diluent, the process could be solution polymerization or slurry polymerization.

The polymerization process can be carried out over a wide range of temperatures and pressures. Usually it will be carried out in a temperature range of about $-50°$ C. to about 200° C., and preferably within the range of from about $-30°$ C. to about 150° C., and most preferably from about 60° C. to about 120° C. The copolymerization temperature can be controlled by jacket cooling-/heating or reflux, or both. Usually the copolymerization process will be carried out at superatmospheric pressure up to several hundred pounds per square inch, or, on the other hand, at subatmospheric or autogenous pressure. The pressure selected depends upon the comonomer selected and is well within the skill of the art to choose the applicable pressure and temperature.

The ethylene oxide copolymer antistatic agent is functional with a wide range of plastics which require the antistatic agent. The antistatic polymeric composition of this invention comprises at least one antistatic additive of ethylene oxide copolymer in the range of from about 3 to about 30% by weight and a polymeric material in the range of from about 70 to about 97% by weight. Standard symbols for polymeric materials are described in ASTM D4000 and are adopted herein. For example, the polymeric materials may be copolymers of styrene and/or $\alpha$-methyl styrene and acrylonitrile such as copolymers of styrene and acrylonitrile (SAN), terpolymers of styrene, acrylonitrile and diene rubber (ABS); copolymers of styrene and acrylonitrile modified with acrylate elastomers (ASA); and copolymers of styrene and acrylonitrile modified with ethylene propylene diene monomer (EPDM) rubber (ASE). Polystyrene and high impact polystyrene may also be employed. Other polymeric materials include polyvinyl chloride (PVC), chlorinated polyvinyl chloride (CPVC), nylon (a polyamide), polycarbonate (PC), thermoplastic polyesters (TPES), including polybutylene terephthalate (PBT), polyethylene terephthalate (PET), and polyether-ester block copolymers (PETG), such as Hytrel ® by DuPont Corp.; Polyurethane (PUR); and termoplastic polyurethane (TPUR); polyphenylene oxide (POP); Polyacetals (POM); copolymer of styrene and maleic anhydride (SMA) and polymethyl methacrylate (PMMA); and mixtures thereof.

For the purpose and scope Of this specification, the term of "polymeric material," which the antistatic additive of this invention incorporated, is expanded to include its closely analogous polymers and its derivatives, and its copolymers. For example, by PVC it is meant polyvinyl chloride, or its closely analogus polymers, such as polyvinyl bromide, polyvinylidene chloride and the like or its derivatives, such as chlorinated polyvinyl chloride and the like, or vinyl chloride copolymers or terpolymers having vinyl chloride as the major component monomer greater than 50% by weight. These compositions include but are not limited to comonomers of vinyl alkanoates such as vinyl acetate and the like, vinylidene halides such as vinylidene Chloride, alkyl esters of carboxylic acids such acrylic acid, ethylacrylate, 2-ethylhexyl acrylate, and the like, unsaturated hydrocarbons such ethylene, propylene, isobutylene, and the like, allyl compounds, such as allyl acetate, and the like. Also for example, the term "terpolymers of styrene, acrylonitrile and butadiene (ABS)" originally denoted a polymer primarily constructed from acrylonitrile, butadiene and styrene, this definition has been expanded to include polymer resins in which these components have been replaced in whole or in part by similar analogus compounds. Exemplary of analogous compounds of acrylonitrile are methacrylonitrile, ethacrylontirle, halogenated acrylonitriles, and the like; exemplary of analogous compounds of styrene are alpha-methyl styrene, chlorostyrene, vinyl toluene and the like; exemplary of analogous compounds of butadiene is isoprene, and the like.

The ethylene oxide copolymers of this invention are also idea antistatic additives for polymer blends which are the physical combination of two or more polymeric resin systems where at least two of the polymers are present in concentrations greater than 5%. The principal reason for blending is to improve the product cost and/or specific property and process performance of a polymer for a specific end-use application. Exemplary polymer blends are ABS/PVC known commercially as Cycovin ® by Borg-Warner, Lustran ® by Monsanto, and Polyman ® by A. Schulman Inc.; ABS/PC known commercially as Bayblend ® by Mobay and Proloy ® by Borg-Warner; ABS/nylon commercially known as Elemid ® by Borg-Warner; ABS/SMA known as Cadon ® by Monsanto; PVC/ASA known as Geloy ® by General Electric; PVC/acrylic known as DKE ® by Sumitomo and Kydex ® by Rohm & Haas; PVC/urethane known as Vythene ® by Alpha Chem & Plastics; PVC/CPE called Hostalite ® by American Hoeschst; PVC/nitrile rubber called Vynite ® by Alpha Chem & Plastics, Hycar ® by BFGoodrich, and Paracril ® by Uniroyal; Acetal/elastomer commercially known as Celcon ® by Celanese, Duraloy ® by Celanese, Delrin ® by DuPont, and Ultraform ® by BASF; PBT/PET known as Celanex ® by Celanese and Valox ® by General Electric; PBT/elastomer called Duralox ®, Gafite ® and Gaftuf ® by Celanese, Valox ® by General Electric, Ultradur ® by BASF; PET/PMMA called Ropet ® by Rohm & Haas; PC/PBT/elastomer known as Xenoy ® and Valox ® by General Electric; PC/PE known as Lexan ® by General Electric and Merlon ® by Mobay; PC/PET known as Xenoy ® by General Electric and Makroblend ® by Mobay; PC/SMA known as Arloy ® by Arco Chemical; PC/TPU known as Texin ® by Mobay; POP/high impact PS known as Noryl ® by General Electric and Prevex ® by Borg-Warner; POP/polyamide known as Noryl ® by General Electric; SMA/high impact PS called Dylark ® by Arco Chemical; Nylon/elastomer called Ultramid ® by BASF; Nylon/ethylene copolymer called Capron ® by Allied Chemical, Nycoa ® by Nylon Corp. of America, Grilon ® by Emser Industries; Nylon/EPDM commercially known as Zytel ® by DuPont; Nylon/PE known as Selar ® by DuPont.

Any plastic (except olefins) in need of an antistatic agent can be employed along with the copolymers of the ethylene oxides of the present invention. However, the antistatic properties are more effective with certain plastics and thus the properties are not uniform between polymeric materials when a constant amount is employed. Additionally, the composition of the ethylene oxide comonomer also effects the antistatic properties.

The composition of antistatic polymeric materials of the present invention can be prepared by mechanical mixing under the influence of heat and/or pressure by a variety of methods. The actual method chosen will depend to some extent on the nature of the polymeric materials and on the desired final physical form of antistatic polymeric materials. Antistatic additives of this invention can be incorporated into polymeric materials together with other compounding ingredients, such as lubricants, plasticizer, stabilizer, fillers, impact modifier, and processing aid, or incorporated separately before or after the polymeric materials are compounded. Once the antistatic agent is compounded with the polymeric material, the antistatic agent tends to migrate to the surface so that it tends to concentrate there and is less concentrated further removed one is from the surface. A well-dispersed composition (despite the migration) is especially preferred because moldability and antistatic properties are especially enhanced and physical properties are less impaired. An ordinary mixer, roll mill, or calender, may be used to incorporate antistatic additives of this invention into polymeric materials to form entirely satisfactory blends at convenient and customary operating conditions. For example, antistatic additives of this invention can conveniently be incorporated into a polymeric material by a biaxial extruder and molded or extruded directly into a final product, or it can be extruded in the form of rods which are chopped up into pellets and used in subsequent operations. Another example is to use a Banbury mixer to give a moldable composition, then the composition is rolled by a mill to form a thick sheet and cubic pellets of the composition are obtained subsequently using a screen granulator. Final articles of antistatic materials can be formed by compression molding, injection molding, blow molding, extrusion, or calendering.

EXAMPLES

The following examples are given to further illustrate the present invention. The antistatic properties of polymers were determined by surface resistivity and static decay time. Both measurements were carried out under controlled conditions at 25° C. with 50% relative humidity. The samples were also conditioned at least 48 hours prior to measurement.

Surface resistivity testing is conducted in accordance with ASTM D257 with an Electrometer (model 617) equipped with a high voltage supply (model 247) and a resistivity adapter (model 6105) all from Keithley Instruments, Inc. The adapter comprises an upper circular electrode and a lower circular electrode encircled with a ringing electrode. A sheet sample (3.5 inches in diameter and $\frac{1}{8}$-1/16 inch thick) was placed between the upper and lower electrodes and a voltage of 500 volts was applied between the electrodes. After 60 seconds, the current was recorded from the Electrometer and converted into surface resistivity in ohms per square using the equation derived from the dimensions of the electrodes.

The end use of the polymeric antistatic material will determine the desired antistatic properties. For example, sophisticated electronic equipment would require a higher degree to antistatic properties than carpet or articles of clothing. Accordingly, different standards have been developed for specific end use applications. For example, electrostatic behavior has been characterized by the Department of Defense in publication DOD-HDBK-263 in terms of surface resistivity. Materials with a surface resistivity in the range of $10^9$–$10^{14}$ ohms per square are antistatic. Materials with a surface resistivity greater than $10^{14}$ are insulators. An effective internal antistat will provide surface resistivity in the area labeled antistatic in the above governmental document. When measuring surface resistivity in the following examples, the Department of Defense Standard was used.

Different standards have also been developed for the static decay test. The static decay test is carried out according to Federal Test Method Standard 101B, Method 4046 with a Static Decay Meter, model 406C obtained from Electro-Tech Systems, Inc. Static decay is a measure of the ability of a material, when grounded, to dissipate a known charge that has been induced on the surface of the material. A sheet sample (3"×6") with ⅛-1/16 inch thickness is placed between clamp electrodes contained in a Faraday cage. A 5,000 volt charge is applied to the surface of the specimen and the time in seconds required to dissipate the charge to 500 volts (10% of its initial value), after a ground is provided, is then measured. Highly insulative materials will not accept a full charge of 5,000 volts on their surface or show residual charge before applying a charge. In both instances, a static decay test cannot apply and the materials are indicated in examples as being insulators. The National Fire Protection Association in NFPA, code 56A, "The Standard for the Use Inhalation Anesthetics" covers products used in the hospital operating room and in hazardous environments. It requires that the applied charge drop to 10% of it initial value within 0.5 seconds at 50% relative humidity in order to qualify for use in hospital operating rooms and other hazardous environments. When measuring static decay in the following examples, the above standard was employed as the desired goal.

Generally, a more conductive material with lower surface resistivity will show better antistatic properties. However, many cases have been found where static behavior is not always related to the surface resistivity of the materials. One of the main reasons is believed that static dissipation is not only by conduction, but also by discharge static electricity into the air. Consequently, materials having same surface resistivity might have different decay rate.

The following physical tests used in Example 8, for example, are carried out in accordance with ASTM standards: Tensile, ASTM D-638; Flexural, ASTM D-790; Heat Distortion, ASTM D-648; Izod Impact, ASTM D-256; and Durometer Hardness "D", ASTM D-2240.

In all examples, antistats of ethylene oxide copolymers and comparative commercial antistats are mixed with thermoplastics or thermoplastic elastomers in a Brabender mixer heated with hot oil. After mixing is completed, a 6"×6"×⅛" or a 6"×8"×1/16" sheet sample was press-molded. Samples were visually examined for detrimental effects of antistats such as marblizing or oiliness on the surface, discoloration or decomposition of polymers and brittleness.

EXAMPLE 1

Antistatic ethylene oxide copolymers were synthesized in one quart, conditioned beverage bottles and capped with self sealing rubber gaskets and two-holed metal caps under nitrogen. Sieve-dried toluene, ethylene oxide, and comonomer were added sequentially. Polymerization was initiated by adding the catalyst and proceeded by tumbling in an oil bath at 110° C. At the end of polymerization, a sample was withdrawn to measure total solids for percent conversion and the polymerization were short-stopped with 8 ml. of isopropanol containing hindered phenolic antioxidant at 0.3 weight percent to the theoretically calculated expected polymer. Then heptane was added to precipitate the polymer and copolymers were dried at 60° C. under vacuum overnight. In order to obtain sufficient amounts of copolymers, copolymers obtained from several duplicated bottle polymerizations were combined. In all polymerizations, coordination catalyst solutions prepared according to U.S. Pat. No. 3,219,591 were used. The molar ratio of catalyst ingredients of triethylaluminum, anhydrous tetrahydrofuran, water, 2,4-pentanedione are 1:2:0.6:0.15–0.60. For comparison, high molecular weight ethylene oxide homopolymers were also synthesized.

Conditions of preparation and characterization of the ethylene oxide copolymers are set forth in Table I. Copolymers of ethylene oxide with ethylene oxide in the range from 32 to 93 weight percent were prepared. The following symbols are used for comonomers:
PO=propylene oxide
DO=dodecylene oxide
BGE=n-butyl glycidyl ether
EHGE=2-ethyl hexyl glycidyl ether Most copolymers were obtained in good yields greater than 80% conversion within three hours polymerization.

TABLE I

PREPARATION AND CHARACTERIZATION OF ANTISTATIC EO COPOLYMERS

| | ANTISTAT | | | | | | | | | | |
|---|---|---|---|---|---|---|---|---|---|---|---|
| COMONOMER | A PO | B PO | C PO | D PO | E PO | F PO | G DO | H BGE | I BGE | J EHGE | K NONE |
| PREPARATION | | | | | | | | | | | |
| Wt. of Toluene, g | 505.0 | 505.0 | 505.0 | 505.0 | 505.0 | 505.0 | 505.0 | 505.0 | 505.0 | 505.0 | 505.0 |
| Wt. of EO, g | 33.0 | 35.0 | 33.0 | 24.0 | 22.5 | 16.0 | 31.0 | 29.0 | 33.0 | 29.0 | 33.0 |
| Wt. of Comonomer, g | 10.0 | 10.0 | 12.0 | 21.0 | 22.5 | 29.0 | 14.0 | 16.0 | 12.0 | 16.0 | 0.0 |
| Catalyst, g based on neat TEAL | 1.5 | 1.5 | 1.5 | 1.5 | 1.5 | 1.5 | 2.5 | 1.9 | 1.5 | 2.3 | 2.3 |
| Pzn. Time, hr | 2 | 2 | 2 | 2 | 3 | 2 | 3 | 2 | 3 | 2 | 3 |
| Ave. Conversion, % | 90 | 90 | 88 | 92 | 88 | 100 | 85 | 81 | 61 | 100 | 78 |
| No. of Bottles | 10 | 10 | 15 | 10 | 1 | 10 | 4 | 10 | 2 | 10 | 2 |
| CHARACTERIZATION | | | | | | | | | | | |
| Wt. % of EO | 85 | 82 | 77 | 60 | 54 | 32 | 75 | 93 | 89 | 67 | 100 |

TABLE I-continued

PREPARATION AND CHARACTERIZATION OF ANTISTATIC EO COPOLYMERS

| COMONOMER | ANTISTAT | | | | | | | | | | |
|---|---|---|---|---|---|---|---|---|---|---|---|
| | A PO | B PO | C PO | D PO | E PO | F PO | G DO | H BGE | I BGE | J EHGE | K NONE |
| Mw by GPC × 1000 | 148 | 14 | 20 | 34 | 590 | 232 | 80 | 11 | n.d. | n.d. | —[a] |
| DSV | 2.1 | 2.8 | 2.7 | 3.3 | 2.8 | 4.5 | 2.2 | 2.0 | 1.5 | 3.3 | —[a] |
| DSC Analysis | | | | | | | | | | | |
| Tg, °C. | −69 | −67 | −67 | −68 | −70 | −68 | −63 | −62 | −63 | −66 | −65 |
| Tm Peak, °C. | 40.0 | 42.0 | 39.0 | 18.0 | 10 | 7.5 | 53.0 | 49.0 | n.d. | 44.0 | 76.0 |
| Hm, cal/g | 11.7 | 12.4 | 10.4 | 2.5 | 3.7 | 0.4 | 16.1 | 13.7 | n.d. | 12.3 | 58.0 |
| TGA, °C. at max loss | 382 | 399 | 396 | 398 | 365 | 395 | 272 | 395 | n.d. | 398 | 375 |

[a]insoluble in solvent tested.
n.d. = not done

Dilusion solution viscosity (DSV) was measured at 0.25 grams per 100 grams toluene at 25° C. with capillary viscometers according to ASTM D2857 referred to therein as inherent viscosity. Molecular weight of copolymers determined by gel permeation chromatography (GPC) using a Water GPC Model 200 instrument at 40° C. in tetrahydrofuran. Molecular weights were calibrated with respect to standard polystyrenes. Because of broad molecular weight distribution, the interpretation of actual molecular weight of copolymers by GCP is difficult. The weight percent of the ethylene oxide in the ethylene oxide copolymer was determined by proton Nuclear Magnetic Resonance (NMR) at 60 megahertz (MHz) using a Varian T60 NMR Spectrometer. The glass transition temperatures (Tg) and melting points (Tm) were measured by Perkin Elmer DSC-2 differential scanning calorimeter at 10° C. per minute heating and cooling rates from −120° C. to 100° C. under 20 cc per minute of helium purge. Thermogravimetric analysis was conducted on a DuPont 951 thermogravimetric analyzer at 10° C. per minute heating rate from 30° C. to 825° C. under a 180 cc per minute nitrogen purge. Copolymers of ethylene oxide/propylene oxide with ethylene oxide in the range from 32 to 70 weight percent are elastomeric, from about 70 to 90 weight percent are semiplastic, and from about 90 weight percent and above are plastic. All antistats of the ethylene oxide comonomers are thermally stable and able to sustain the process temperature of most plastics. This experiment demonstrates that a variety of comonomers can be employed with EO to make an antistatic agent within the correct molecular weight or DSV for the present invention.

EXAMPLE 2

In this example the antistatic ethylene oxide copolymers of Example 1 were incorporated into a semirigid PVC injection molding compound to determine the antistatic properties of the antistatic agents. The PVC compound is composed of:

| | |
|---|---|
| Geon ® PVC homopolymer resin (registered trademark of B.F. Goodrich Company) | 100 weight parts |
| Impact modifier | 12 weight parts |
| Processing Aid | 2 weight parts |
| Stabilizer | 2 weight parts |
| Stearic Acid | 0.5 weight parts |

The mixing was conducted at 170° C. in a Brabender mixer. The results of the antistatic properties of 100 parts of PVC compound containing 10 parts of antistatic ethylene oxide copolymers are set forth in Table II as examples 2B-2K. Example 2A was the control containing no antistatic agent but merely the semirigid PVC injection molding compound. All PVC compounds having 10 weight parts of the antistatic agent had surface resistivities less than $10^{14}$ ohm/sq. without any detrimental effect being visually observed upon examination. It was found that copolymers of ethylene oxide and propylene oxide are more effective antistatic additives than copolymers of ethylene oxide with other comonomers of 1,2-epoxide. It was also surprising to find that the antistatic properties of the PVC compound are rather insensitive to the composition of ethylene oxide/propylene oxide antistat in the range from 32 to 85 weight percent EO.

TABLE II

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| CONTROL 2A | None | — | Control | 0.0 | >1.0E + 16 | Insulator | None |
| ANTISTATIC EO COPOLYMERS OF THIS INVENTION | | | | | | | |
| 2B | EO/PO | 85 | Antistat A | 10.0 | 3.00E + 12 | 0.15 | None |
| 2C | EO/PO | 82 | Antistat B | 10.0 | 3.80E + 12 | 0.44 | None |
| 2D | EO/PO | 77 | Antistat C | 10.0 | 1.20E + 12 | 0.11 | None |
| 2E | EO/PO | 60 | Antistat D | 10.0 | 1.70E + 12 | 0.18 | None |
| 2F | EO/PO | 54 | Antistat E | 10.0 | 2.10E + 11 | 0.11 | None |
| 2G | EO/PO | 32 | Antistat F | 10.0 | 8.40E + 12 | 0.64 | None |
| 2H | EO/DO | 75 | Antistat G | 10.0 | 2.90E + 13 | 1.11 | None |
| 2I | EO/BGE | 93 | Antistat H | 10.0 | 1.10E + 13 | 0.89 | None |
| 2J | EO/BGE | 89 | Antistat I | 10.0 | 6.60E + 13 | 1.70 | None |
| 2K | EO/EHGE | 67 | Antistat J | 10.0 | 4.70E + 13 | 0.90 | None |

EXAMPLE 3

For the purposes of comparison, an ethylene oxide homopolymer, low molecular weight liquid ethylene oxide/propylene oxide random copolymer, and low molecular weight ethylene oxide/propylene oxide block copolymers were examined with the PVC compound used in Example 2. An ethylene oxide homopolymer of Antistat K made in Example I was synthesized in the same manner as the ethylene oxide/propylene oxide copolymers of this invention. Another ethylene oxide homopolymer (referred to as "commercial") was obtained from Poly Science, Inc. with an average molecular weight of $5 \times 10^6$. Both ethylene oxide homopolymers are uneffective antistats, i.e. both are classified as insulators according to the Department of Defense standards mentioned previously. Another commercially available antistat which was compared was Carbowax ® 4000. Carbowax ® 4000 is a low molecular weight polyethylene glycol obtained from Union Carbide Company. Using polyethylene glycol as an antistat is well known. However, polyethylene glycol is difficult to blend into the PVC compound and the sample became brittle.

Low molecular weight liquid ethylene oxide/propylene oxide random copolymers were obtained from Union Carbide under the tradename Ucon ® and compared. The amount of ethylene oxide vary from 0 to 75 weight percent. Example 3D has an average molecular weight of 12,000; Example 3E has an average molecular weight of 2,500; Example 3F has an average molecular weight of 1,050; Example 3G has an average molecular weight of 4,000; Example 3H has an average molecular weight of 2,600; and Example 3I has an average molecular weight of 1,220.

Though the Ucon ® polymers provide good antistat properties, all samples became brittle and most showed poor surface properties (blooming, marblizing, and/or oiliness).

Block copolymers of ethylene oxide and propylene oxide were obtained from BASF Wyandotte Company under the tradename of Pluronic ®. The amount of ethylene oxide can vary from 10 to 80 weight percent of the antistat. This amount is indicated as the number before the word Pluronic in Table III. Example 3J had an average molecular weight of 3,250; Example 3K has an average molecular weight of 4,000; Sample 3L had an average molecular weight of 3,250; Sample 3M had an average molecular weight of 4,000; and Sample 3N had an average molecular weight of 4,000. Most Pluronic polymers provide antistat properties. However, they were difficult to blend with PVC and it is theorized that the same problem would occur with other plastics such as ABS, etc. All samples became brittle and most showed poor surface properties such as those mentioned above with respect to the liquid copolymers. The results of these samples are set forth in Table III.

TABLE III

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| COMMERCIAL AND COMPARATIVE ANTISTATS EO HOMOPOLYMERS |||||||||
| 3A | EO | 100 | Antistat K | 10.0 | 4.40E + 14 | Insulator | None |
| 3B | EO | 100 | Commercial | 10.0 | 1.00E + 14 | Insulator | None |
| 3C | EO | 100 | Carbowax 4000 | 10.0 | 5.50E + 13 | Insulator | B |
| EO/PO LIQUID COPOLYMERS FROM UNION CARBIDE |||||||||
| 3D | EO/PO | 75 | Ucon 75-H-9000 | 10.0 | 1.90E + 11 | 0.17 | B,S |
| 3E | EO/PO | 75 | Ucon 75-H-1400 | 10.0 | 4.20E + 10 | 0.03 | B,S |
| 3F | EO/PO | 75 | Ucon 75-H-450 | 10.0 | 5.00E + 13 | n.d. | B,S |
| 3G | EO/PO | 50 | Ucon 50-HB-5100 | 10.0 | 4.60E + 11 | 0.24 | B,S |
| 3H | EO/PO | 0 | Ucon LB-1715 | 10.0 | 1.10E + 13 | 3.33 | B,S |
| 3I | EO/PO | 0 | Ucon LB-385 | 10.0 | 2.30E + 12 | 0.22 | B,S |
| EO/PO LIQUID BLOCK COPOLYMERS FROM BASF WYANDOTTE |||||||||
| 3J | EO/PO | 80 | Pluronic F108 | 10.0 | 6.00E + 13 | Insulator | B,s |
| 3K | EO/PO | 70 | Pluronic F127 | 10.0 | 1.10E + 14 | Insulator | B |
| 3L | EO/PO | 50 | Pluronic P105 | 10.0 | 1.30E + 12 | 2.16 | B |
| 3M | EO/PO | 30 | Pluronic P123 | 10.0 | 1.90E + 12 | 0.31 | B,S |
| 3N | EO/PO | 10 | Pluronic L101 | 10.0 | 4.50E + 12 | 0.18 | B,S |

*Detrimental Effect: B = Brittle, C = Color (stability problems), and S = Surface problems.

EXAMPLE 4

For the purpose of comparison, commercial nonionic antistats were examined with PVC compound used in Example II. These antistatic agents were obtained from Argus Chemical Division of Witco Chemical Company under the trade name of Markstat ®. These commercial antistats are for rigid or plasticized PVC. The antistatic agent used in Sample 4A is a alkyl ethoxylated blend; the antistatic agent used in 4B is the same as that used in 4A except that the percent weight of antistatic agent is significantly lower; the antistatic agent set forth in samples 4C and 4D are polyether blends. The results are set forth in Table IV.

TABLE IV

| COMMERCIAL NON-IONIC ANTISTATS ||||||||
| Example No. | Antistat | Comment | Wt. % Antistat | Surface Resistivity Ohm/sq. | Decay Rate (10% Cut) in Sec | Detrimental Effect |
|---|---|---|---|---|---|---|
| 4A | Nonionic | Markstat AL-15 | 10.0 | 3.10E + 15 | Insulator | C (L Yellow) |
| 4B | Nonionic | Markstat AL-15 | 3.5 | 8.80E + 15 | Insulator | None |
| 4C | Polyether | Markstat AL-14 | 10.0 | 2.90E + 15 | Insulator | B,C (L Yellow) |
| 4D | Polyether | Markstat AL-13 | 10.0 | 8.60E + 11 | 0.09 | B,S |

*Detrimental Effect: B = Brittle, C = Color (stability problems), and S = Surface problems.

Samples 4A through 4C all show poor antistatic properties. Although sample 4D showed good antistatic properties, but the sample was brittle and showed poor surface properties (blooming, etc.) such as those mentioned previously. In the prior art section of this disclosure, it was stated that anionic and cationic antistatic agents cause poor surface and physical properties when blended with polymeric materials. Additionally, it was pointed out that the antistatic agents of the present invention are nonionic. Example 4 demonstrates that some nonionic antistatic agents can also cause poor surface and physical properties. Accordingly, the present invention is more than merely employing a solid nonionic antistat.

EXAMPLE 5

For comparison purposes, commercial cationic antistats based upon amines, amides, and phosphates were examined with the PVC compound used in Example II. The amines were ethoxylated and obtained from Humco Chemical Division of Witco Chemical Corp. under the trade name of Kemamine ®. These antistats of ethoxylated amines are well known for use with polyolefins and also available as Armostat ® from Noury and markstat ® AL-10 from Argus. Ethoxylated amides were obtained from Akzo Chemie America under the trade name of Ethmid ® and from Onyxol Chemical Company under the trade name of Onyxol ®. Phosphate ester was obtained from Emery Industries under the trade name of Tryfac ®. Phosphate esters are also available as Gafac ® from GAF Corporation and Zelec ® from DuPont. Phosphate esters are well known antistats for textile applications. The percent weight of ethylene oxide in the antistatic agents are set forth in Table V. While some antistatic additives show good antistatic properties, all samples discolored which indicated the decomposition of the PVC compound. Cationic antistatic agents generally cause stability problems of PVC compounds. The non-ionic antistats agents of the present invention are superior to cationic antistatic agents since non-ionic antistats cause no stability problems.

EXAMPLE 6

For comparison purposes, commercial cationic antistats of quaternary ammonium salts were examined with the PVC compound used in Example 2. Quaternary ammonium salts were obtained from Argas Chemical Division of Wico Chemical Company under the trade name of Markstat ® and from American Cyanamide Company under the trade name of Cyastat ® as heat stable antistats. The results are set forth in Table VI. All the samples had low surface resisitivities with the exception of Sample 6c, which decomposed and discolored so badly that no surface resistivity measurement could be made. All of the samples discolored to an unacceptable level.

TABLE VI

COMMERCIAL ANTISTATS OF QUAT SALTS

| Example No. | Antistat | Comment | Wt. % Antistat | Surface Resistivity Ohm/sq. | Decay Rate (10% Cut) in Sec | Detrimental Effect |
|---|---|---|---|---|---|---|
| 6A | Quat | Markstat AL-33 | 3.5 | 2.40E + 12 | 0.35 | C (L Yellow) |
| 6B | Quat | Markstat AL-33 | 2.5 | 8.30E + 12 | 1.78 | C (L Yellow) |
| 6C | Quat | Markstat AL-12 | 3.5 | n.d. | n.d. | (Black) |
| 6D | Quat | Cyastat LS | 3.5 | 1.10E + 09 | 0.01 | C (L Yellow) |
| 6E | Quat | Cyastat 609 | 3.5 | 5.90E + 11 | 0.18 | C (L Yellow) |

*Detrimental Effect: B = Brittle, C = Color (stability problems), and S = Surface problems.

EXAMPLE 7

In this example, the concentration of the antistat and its effects with respect to its antistatic properties when combined with the PVC compound used in Example 2 is demonstrated. In samples 7A–7G, Antistat (A) (see Example 1) of the present invention was used. Antistatic properties, when the antistat was blended with the PVC, improved as the concentration of the antistat increased. However, when the concentration of the antistat became too high, poor surface properties developed. Low molecular weight antistats of Pluronic ® ethylene oxide copolymers were also examined as set forth in samples 7H–7M. At high concentration, some of these liquid block copolymers show good antistatic properties, however, all samples were brittle and/or showed poor surface properties. Samples having a low concentration of antistatic material, not only showed poor antistatic properties, but most samples were still brittle and/or contained poor surface features.

TABLE V

COMMERCIAL ANTISTATS OF AMINES AND AMINDS

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| 5A | Amine | 25 | Kemamine AS-974/1 | 10.0 | 3.60E + 10 | 0.08 | C (Dark Yellow) |
| 5B | Amine | 25 | Kemamine AS-974/1 | 5.0 | 1.00E + 13 | Insulator | C (Dark Yellow) |
| 5C | Amine | 25 | Kemamine As-990 | 5.0 | 6.50E + 12 | 0.84 | C (Yellow) |
| 5D | Amine | 65 | Ethmid HT/23 | 5.0 | 2.20E + 14 | Insulator | C (L Yellow) |
| 5E | Amine | 89 | Ethmid HT/60 | 5.0 | 1.0E + 16 | Insulator | C (Yellow) |
| 5F | Amine | 31 | Onyxol 345 | 10.0 | 3.40E + 09 | 0.01 | S,C (D. Yellow) |
| 5G | Amine | 31 | Onyxol 345 | 5.0 | 6.90E + 09 | 0.01 | S,C (D. Yellow) |
| COMMERCIAL ANTISTATS OF PHOSPHATES | | | | | | | |
| 5H | Phosphate | — | Tryfac 5559 | 5.0 | 2.20E + 13 | 1.50 | C (Orange) |

*Detrimental Effect: B = Brittle, C = Color (stability problems), and S = Surface problems.

TABLE VII
EFFECT OF CONCENTRATION OF ANTISTAT ON ANTISTATIC PROPERTIES OF PVC COMPOUNDS

| Example No. | Antistat | EO Wt. % | Comment | Wt. % Antistat | Surface Resistivity Ohm/sq. | Decay Rate (10% Cut) in Sec | Detrimental Effect |
|---|---|---|---|---|---|---|---|
| ANTISTATIC EO COPOLYMERS OF THIS INVENTION | | | | | | | |
| 7A | EO/PO | 85 | Antistat A | 25.0 | 7.00E + 10 | 0.01 | S |
| 7B | EO/PO | 85 | Antistat A | 20.0 | 2.80E + 11 | 0.02 | None |
| 7C | EO/PO | 85 | Antistat A | 15.0 | 2.30E + 12 | 0.03 | None |
| 7D | EO/PO | 85 | Antistat A | 10.0 | 3.00E + 12 | 0.15 | None |
| 7E | EO/PO | 85 | Antistat A | 7.5 | 4.80E + 12 | 0.57 | None |
| 7F | EO/PO | 85 | Antistat A | 5.0 | 2.10E + 13 | 4.40 | None |
| 7G | EO/PO | 85 | Antistat A | 3.5 | 4.00E + 15 | Insulator | None |
| COMPARATIVE ANTISTATS | | | | | | | |
| EO/PO LIQUID BLOCK COPOLYMERS FROM BASF WYANDOTTE | | | | | | | |
| 7H | EO/PO | 80 | Pluronic F108 | 10.0 | 6.00E + 13 | Insulator | B,S |
| 7I | EO/PO | 80 | Pluronic F108 | 3.5 | 3.80E + 15 | Insulator | B |
| 7J | EO/PO | 70 | Pluronic F127 | 10.0 | 1.10E + 14 | Insulator | B |
| 7K | EO/PO | 70 | Pluronic F127 | 3.5 | 1.50E + 14 | Insulator | B |
| 7L | EO/PO | 10 | Pluronic L101 | 10.0 | 4.50E + 12 | 0.18 | B,S |
| 7M | EO/PO | 10 | Pluronic L101 | 3.5 | 2.20E + 14 | Insulator | S |

*Detrimental Effect: B = Brittle, C = Color (stability problems), and S = Surface problems (marblized or (and) oily).

EXAMPLE 8

Physical properties of the antistatic PVC compounds used in Example 2 are shown in Table VIII. The PVC compounds containing Antistat A, B, D, F, and G did not significantly impair physical properties. Whereas impact properties of the PVC compound containing low molecular weight antistats of Ucon ® and Pluronic ® ethylene oxide copolymers were severely damaged even at lower concentration.

TABLE VIII
PHYSICAL PROPERTIES OF ANTISTATIC PVC COMPOUNDS

| | 8A | 8B | 8C | 8D | 8E | 8F | 8G | 8H | 8I | 8J | 8K | 8L | 8M |
|---|---|---|---|---|---|---|---|---|---|---|---|---|---|
| Antistat | Control | A | B | D | F | G | Ucon 75 | Ucon 75 | Ucon 50 | Ucon 50 | Pluro F127 | Pluro F127 | Carbowax 4000 |
| Antistat Type | None | EO/PO | EO/PO | EO/PO | EO/PO | EO/DO | EO/PO | EO/PO | EO/PO | EO/PO | EO/PO | EO/PO | EO |
| EO % | — | 85 | 82 | 60 | 32 | 75 | 75 | 75 | 50 | 50 | 70 | 70 | 100 |
| Wt. % | 0 | 10 | 10 | 10 | 10 | 10 | 10 | 5 | 10 | 5 | 10 | 5 | 10 |
| Flexural Tests, ASTM D-790 | | | | | | | | | | | | | |
| Modulus, psi × 1000 | 387 | 290 | 314 | 322 | 294 | 323 | 333 | 378 | 291 | 358 | 353 | 364 | 435 |
| Strength, psi × 1000 | 10.8 | 6.8 | 7.2 | 7.4 | 7.1 | 7.9 | 6.4 | 8.9 | 5.4 | 8.8 | 7.9 | 8.7 | 11.1 |
| Heat Distortion, ASTM D-648 C at 264 psi | 69 | 67 | 67 | 68 | 68 | 66 | 61 | 63 | 70 | 69 | 65 | 67 | 57 |
| Izod Impact, ASTM D-256 ft. lb./in. of notch | 16.7 | 13.0 | 13.3 | 12.5 | 13.3 | 14.6 | 1.3 | 2.3 | 1.1 | 2.5 | 1.2 | 2.9 | 2.7 |
| Tensile, ASTM D-638 | | | | | | | | | | | | | |
| Strength at yield, 1000 × ps | 6.8 | 3.7 | 4.1 | 4.4 | 4.5 | 4.8 | 3.2 | 4.9 | 3.4 | 5.6 | 4.6 | 5.2 | 6.5 |
| Modulus, 100,000 × psi | 3.9 | 2.7 | 3.0 | 3.1 | 3.0 | 3.0 | 3.0 | 3.6 | 3.7 | 3.7 | 3.2 | 3.2 | 4.1 |
| Durometer Hardness "D" ASTM D2240 | 82 | 73 | 75 | 74 | 73 | 77 | 73 | 75 | 81 | 81 | 77 | 81 | 83 |

EXAMPLE 9

Dynamic thermal stability tests were also carried out to examine the effect of antistats on the stability of the PVC compounds used in Example 2. In particular, the mixing time in minutes that it took for a particular sample to yellow and then to blacken was recorded. If an additive impair the thermal stability of PVC, it will show a shorter time to yellowen and blacken the sample and a shorter time to reach minimum torque indicating a faster breakdown of PVC in this test.

In this example, an antistat was mixed with PVC compound in a Brabender mixer at 190° C. and 185 rpm. The sample was pinched every two minutes and color development was examined. The results are set forth in Table IX below.

TABLE IX
Dynamic Thermal Stability Tests
Mixing Time in Minutes

| | Control | Antistat A | Antistat D | Cyastat LS |
|---|---|---|---|---|
| Example No. | 9A | 9B | 9C | 9D |
| Antistat | None | EO/PO | EO/PO | Quat |
| Wt. Type % | — | 10 | 10 | 3.5 |
| Early color before light yellow. | 8 | 10 | 12 | 4 |
| Black color | 28 | 32 | 34 | 20 |
| Minimum Torque | 26 | 26 | 28 | 20 |

As shown in Table IX, antistatic EO/PO copolymers of this invention do not impair the thermal stability of PVC compounds. Whereas commercial so called heat stable quaternary ammonium salt, Cyastat ® LS causes severe degradation of PVC compound.

EXAMPLE 10

The effect of antistats on the thermal stability of PVC compounds was also examined with thermogravimetric analysis. The incorporation of antistatic EO/PO copolymers of this invention into PVC compounds do not lower the temperature at maximum rate of weight loss (Table X). On the other hand, the incorporation commercial cationic antistatic amines or quaternary ammonium salts severely damaged the thermal stability of PVC compounds.

TABLE X

Thermogravimetric Analysis of Antistatic PVC Compounds

| Example No. | Antistat | Type | Wt. % | °C. at Maximum Rate of Wt. Loss |
|---|---|---|---|---|
| 10A | Control | — | — | 291 |
| 10B | Antistat A | EO/PO | 10 | 304 |
| 10C | Antistat E | EO/PO | 10 | 301 |
| 10D | Markstat AL-33 | Quat | 3.5 | 265 |
| 10E | Kemamine AS-900 | Amine | 5.0 | 254 |
| 10F | Kemamine AS-974/1 | Amine | 5.0 | 257 |

EXAMPLE 11

In this example, antistatic EO copolymers of this invention were examined for ABS thermoplastics. ABS thermoplastics are terpolymers of acrylonitrilebutadiene-styrene. The following ABS thermoplastics obtained from Borg-Warner Chemicals were studied:

1. Cycolac ®T, a general purpose molding material, mixed at 190° C.
2. Cycolac ®L, a high impact injection molding material, mixed at 190° C.
3. Cycolac ®KJB, a medium-impact, flame-retardant injection molding material, mixed at 185° C.
4. Blendex ® 131, a material for calendered sheet applications and a modifier for PVC products, mixed at 180° C.

As shown in Table XI, EO copolymers of this invention were effective antistats for ABS thermoplastics. On the other hand, EO homopolymer, low molecular weight EO copolymer, and amine type antistats were uneffective. Table XIa shows the physical properties of Cycolac L and T ABS thermoplastics containing EO copolymers of this invention. The results indicate that the antistatic agents of the present invention are useful with ABS polymeric materials.

TABLE XI

Antistatic Properties of ABS Thermoplastics

| Antistat | Comment | EO Wt. % | Wt. % Antistat Added | Surface Resistivity, ohm/sq Cycolac KJB | Cycolac L | Cycolac T | Blender 131 |
|---|---|---|---|---|---|---|---|
| None | Control | — | 0 | >1.0E + 16 | >1.0E + 16 | >1.0E + 16 | >1.0E + 16 |
| ANTISTATS OF THIS INVENTION | | | | | | | |
| EO/PO | Antistat A | 85 | 10 | 3.0E + 13 | 5.2E + 12 | — | 3.1E + 12 |
| EO/PO | Antistat B | 82 | 10 | — | 1.4E + 13 | 4.8E + 13 | — |
|  |  |  | 15 | — | 7.4E + 12 | — | — |
|  |  |  | 20 | — | 2.2E + 12 | — | — |
| EO/PO | Antistat C | 77 | 10 | — | 1.1E + 13 | 1.3E + 13 | — |
|  |  |  | 15 | — | 1.9E + 12 | 5.1E + 12 | — |
|  |  |  | 20 | — | 1.5E + 12 | 3.3E + 12 | — |
| EO/PO | Antistat D | 60 | 10 | — | 1.4E + 13 | 1.2E + 13 | — |
|  |  |  | 15 | — | 1.1E + 13 | — | — |
|  |  |  | 20 | — | 1.8E + 12 | — | — |
| EO/PO | Antistat E | 32 | 10 | — | — | 3.6E + 13 | — |
| EO/BGE | Antistat H | 93 | 10 | — | — | 1.1E + 14 | — |
| COMPARATIVE AND COMMERCIAL ANTISTATS | | | | | | | |
| EO | Commercial | 100 | 10 | — | — | — | 1.1E + 15 |
| EO/PO | Pluronic F108 | 80 | 10 | — | — | — | 1.0E + 15 |
| Amine | Kemamine AS-274/1 | — | 10 | 1.0E + 16 | — | — | — |
|  |  | — | 5 | — | — | — | 3.5E + 15 |
| Amine | Armostat 410 | — | 5 | — | — | — | 3.6E + 15 |

TABLE XIa

Antistatic and Physical Properties of ABS Thermoplastics

| | Cycolac L | | | | | | |
|---|---|---|---|---|---|---|---|
| Example No. | 11A | 11B | 11C | 11D | 11E | 11F | 11G |
| Antistat ID | Control | EO/PO | EO/PO Antistat C | EO/PO | EO/PO | EO/PO Antistat B | EO/PO |
| EO % | — | 77 | 77 | 77 | 82 | 82 | 82 |
| wt % | — | 10 | 15 | 20 | 10 | 15 | 20 |
| Surface resistivity, ohm/sq | >1.0E + 16 | 1.1E + 13 | 1.9E + 12 | 1.5E + 12 | 1.4E + 13 | 7.4E + 12 | 2.2E + 12 |
| Decay rate at 10%, sec | Insulator | 4.00 | 0.40 | 0.07 | 1.90 | 1.30 | 0.27 |
| Flexural Tests, ASTM D-790 | | | | | | | |
| Modulus, psi × 1000 | 274 | 224 | 200 | 164 | 221 | 196 | 175 |
| Strength, psi × 1000 | 8.1 | 5.5 | 4.9 | 3.5 | 5.6 | 4.8 | 3.9 |
| Heat Distortion, ASTM D-648 °C. at 264 psi | 79 | 77 | 78 | 73 | 79 | 78 | 75 |
| Izod Impact, ASTM D-256 ft-lb/in | 7.7 | 6.4 | 6.5 | 6.2 | 8.0 | 6.9 | 5.5 |
| Tensile, ASTM D-638 | | | | | | | |
| Strength at break, psi × 100 | 4.6 | 6.1 | 5.6 | n.d. | 4.9 | 6.2 | 3.8 |

TABLE XIa-continued

| | Antistatic and Physical Properties of ABS Thermoplastics | | | | | | |
|---|---|---|---|---|---|---|---|
| Modulus, psi × 100,000 | 2.5 | 4.1 | 4.0 | n.d. | 3.8 | 4.0 | 3.4 |

| | Cycolac L | | | Cycloac T | | | |
|---|---|---|---|---|---|---|---|
| Example No. | 11H | 11I | 11J | 11K | 11L | 11M | 11N |
| Antistat ID | EO/PO | EO/PO Antistat D | EO/PO | Control | EO/PO | EO/PO Antistat C | EO/PO |
| EO % | 60 | 60 | 60 | — | 77 | 77 | 77 |
| wt % | 10 | 15 | 20 | — | 10 | 15 | 20 |
| Surface resistivity, ohm/sq | 1.4E + 13 | 1.1E + 13 | 1.8E + 12> | 1.0E + 15 | 1.3E + 13 | 5.1E + 12 | 3.3E + 12 |
| Decay rate at 10%, sec | 2.10 | 0.97 | 0.27 | Insulator | n.d. | n.d. | n.d. |
| Flexural Tests, ASTM D-790 | | | | | | | |
| Modulus, psi × 1000 | 217 | 196 | 166 | 362 | 302 | 262 | 230 |
| Strength, psi × 1000 | 5.8 | 4.7 | 3.5 | 10.5 | 6.1 | 5.9 | 4.6 |
| Heat Distortion, ASTM D-648 °C. at 264 psi | 79 | 78 | 81 | 83 | 84 | 81 | 81 |
| Izod Impact, ASTM D-256 ft-lb/in | 7.3 | 6.4 | 6.0 | n.d. | 2.8 | 2.6 | 2.1 |
| Tensile, ASTM D-638 | | | | | | | |
| Strength at break, psi × 100 | 6.3 | 4.5 | 3.7 | 6.4 | 3.9 | 3.1 | 2.0 |
| Modulus, psi × 100,000 | 4.5 | 3.8 | 3.1 | 3.4 | 2.9 | 2.3 | 2.2 |

EXAMPLE 12

In this example, antistatic EO copolymers of this invention were examined as antistats for polystyrene. Eighty parts high impact injection molding polystyrene, commercially known as Cosden® 945, was obtained from Cosden Oil and Chemical Co. and mixed with 20 parts of Antistat C at 190° C. The mixture gave a surface resistivity of $5.3 \times 10^{12}$ ohm/sq. and a decay rate (10% cut) of 0.75 sec. Cosden 945 without antistat gives a surface resistivity of greater than $10^{15}$ ohm/sq. and is an insulator as indicated by the decay rate. Eighty parts of Styron® 420, obtained from Dow Chemical Co., was mixed with 20 parts of Antistat C at 190° C. The mixture gave a surface resistivity of $9.6 \times 10^{11}$ ohm/sq. and a decay rate (10% cut) of 0.6 sec. Styron 420 without antistat gives a surface resistivity of greater than $10^{15}$ ohm/sq. and is an insulator as indicated by the decay rate. The results are summarized in Table XII.

EXAMPLE 13

In this example, antistatic EO copolymers of this invention were examined for impact-modified styrene-maleic anhydride terpolymers, a polymer blend of ABS and styrene-maleic anhydrin copolymer (SMA). To 90 parts of high heat grade ABS/SMA polymer blend, commercially known as Cadon® 127, obtained from Monsanto, was mixed with 10 parts of antistat at 190° C. Antistat A gives a surface resistivity of $3.8 \times 10^{12}$ ohm/sq. and a decary rate (10% cut) of 1.2 sec.; Antistat D gives a surface resistivity of $4.5 \times 10^{12}$ ohm/sq. and a decay rate (10% cut) of 1.2 sec. Cadon 127 without antistat gives a surface resistivity of greater than $10^{15}$ ohm/sq. and is an

TABLE XII

| | Antistatic and Physical Properties of Polystyrenes | | | | | |
|---|---|---|---|---|---|---|
| | Cosden 945 | | | Styron 420-27W | | |
| Example No. | 12A | 12B | 12C | 12D | 12E | 12F |
| Antistat ID | Control | EO/PO Antistat C | EO/PO | Control | EO/PO Antistat C | EO/PO |
| EO % | — | 77 | 77 | — | 77 | 77 |
| Wt % | — | 10 | 20 | — | 10 | 20 |
| Surface resistivity, ohm/sq. | 1.0E + 15 | 8.3E + 13 | 5.3 + 12 | 1.0E + 15 | 2.1E + 12 | 9.6E + 11 |
| Decay rate at 10%, sec. | Insulator | 9.40 | 0.75 | Insulator | 17.00 | 0.61 |
| Flexural Tests, ASTM D-790 | | | | | | |
| Modulus, psi × 1000 | 292 | 253 | n.d. | 384 | 341 | 221 |
| Strength, psi × 1000 | 4.0 | 3.4 | n.d. | 6.7 | 5.2 | 4.0 |
| Heat Distortion, ASTM D-648 °C. at 264 psi | 77 | 74 | 75 | 85 | 84 | 84 |
| Izod Impact, ASTM D-256 ft. lb/in | 2.3 | 2.9 | 4.0 | 1.8 | 2.4 | 2.8 |
| Tensile, ASTM D-638 | | | | | | |
| Strength at break, psi × 1000 | 2.3 | 2.0 | 1.7 | 3.6 | 3.1 | 1.6 |
| Modulus, psi × 100,000 | 2.7 | 2.2 | 2.0 | 3.6 | 3.0 | 2.5 |

TABLE XIII

| | Antistatic and Physical Properties of Sytrene - Maleic Anhydride Terpolymer | | |
|---|---|---|---|
| | Example No. | | |
| | 13A | 13B | 13C |
| Antistat ID | Control — | EO/PO Antistat A | EO/PO Antistat B |
| EO % | — | 85 | 60 |
| wt % | 0 | 10 | 10 |
| Surface Resistivity, ohm/sq | >1.0E + 15 | 3.8E + 12 | 4.5E + 12 |
| Decay rate at 10%, sec. | Insulator | 1.20 | 1.20 |
| Flexural Tests/ ASTM D-790 | | | |
| Modulus, psi × 1000 | 352 | 267 | 269 |
| Strength, psi × 1000 | 8.2 | 5.8 | 5.6 |
| Heat Distortion, ASTM D-648 °C. at 264 psi | 98 | 103 | 98 |
| Izod Impact, ASTM D-256 ft-lb/in of notch | 3.6 | 5.1 | 2.2 |
| Tensile/ASTM D-638 | | | |

TABLE XIII-continued

| Antistatic and Physical Properties of Sytrene - Maleic Anhydride Terpolymer | | | |
|---|---|---|---|
| | Example No. | | |
| | 13A | 13B | 13C |
| Strength at yield, 1000 × psi | 4.2 | n.d. | 2.3 |
| Modulus, 100,000 × psi | 3.2 | n.d. | 2.3 |
| Durometer Hardness "D" ASTM D2240 | 80 | 73 | 73 | insulator by decay rate. Antistatic and physical properties of Cadon 127 are shown in Table XIII.

EXAMPLE 14

In this example, antistatic EO copolymers of this invention were examined as antistats for polyacetal. Celcon ® M270-04, obtained from Celanese Co., is a high flow injection molding grade polyacetal. It was mixed with antistats at 195° C. As shown in Table XIV, Antistats B, D, E and J (see Example 1) of this invention are effective antistats for polyacetal (Example 14B-14I). On the other hand, polyacetal containing 5 parts of Kemamine AS-974/1 (see Example 5) shows no improvement on surface resistivity or static decay rate (Example 14J).

EXAMPLE 15

In this example, antistatic EO copolymers of this invention were examined as antistats for modified polyphenylene oxide. Noryl ® PC180, a polymer blend of polyphenylene oxide and polystyrene obtained from General Electric Co., is a computer and business equipment grade of polymeric material. It was mixed with antistats at 180° C. As shown in Table XV, Antistats B, C and E of this invention are effective for modified polyphenylene oxide.

TABLE XV

| | Antistatic and Physical Properties of Modified Poly(phenylene oxide) | | | | | | |
|---|---|---|---|---|---|---|---|
| Example No. | 15A | 15B | 15C | 15D | 15E | 15F | 15G |
| Antistat | None | Antistat B | | Antistat C | | Antistat E | |
| Type | Control | EO/PO | EO/PO | EO/PO | EO/PO | EO/PO | EO/PO |
| EO % | | 82 | 82 | 77 | 77 | 32 | 32 |
| Wt % | | 10 | 20 | 10 | 20 | 10 | 20 |
| Surface resistivity, ohm/sq. | 1.0E + 16 | 2.0E + 13 | 3.7E + 11 | 8.2E + 12 | 4.1E + 11 | 5.1E + 13 | 1.9E + 12 |
| Decay rate at 10%, sec. | Insulator | 12.00 | 0.03 | 1.70 | 0.04 | 4.20 | 0.18 |
| Flexural Tests, ASTM D-790 | | | | | | | |
| Modulus, psi × 1000 | 391 | 321 | 212 | 319 | n.d. | 322 | 165 |
| Strength, psi × 1000 | 9.2 | 6.6 | 3.8 | 7.0 | n.d. | 6.7 | 2.7 |
| Heat Distortion, ASTM D-648 °C. at 264 psi | 80 | 86 | 91 | 94 | n.d. | 79 | 75 |
| Izod Impact, ASTM D-256 ft. lb./in of notch | 1.50 | 1.85 | 1.07 | 2.40 | n.d. | 1.89 | 1.58 |
| Tensile, ASTM D-638 | | | | | | | |
| Strength at break, psi × 1000 | 4.7 | 3.1 | 2.1 | 3.1 | n.d. | 3.9 | n.d. |
| Modulus, psi × 100,000 | 3.4 | 2.3 | 2.1 | 2.6 | n.d. | 3.3 | n.d. |
| Durometer hardness, "D" ASTM D-2240 | 86 | 76 | 62 | 75 | n.d. | 77 | 60 |

EXAMPLE 16

In this example, antistatic EO copolymers of this invention were examined for polyester Hytrel ® 6346, obtained from DuPont Co., is a thermoplastic elastomer of a polyester-ether block copolymer comprising polybutylene terephthalate (PBT) hard segments and polytetramethylene glycol terephthalate soft segments. To Ninety parts of Hytrel ® was mixed with 10 parts of Antistat A at 210° C. The mixture gave a surface resistivity of $9.4 \times 10^{11}$ ohm/sq. and a decay rate (10% cut) of 0.15 sec. Hytrel 6346 without antistat gave a surface resistivity greater than $10^{15}$ ohm/sq and was

TABLE XIV

| | Antistatic and Physical Properties of Polyacetal | | | | | | | | | |
|---|---|---|---|---|---|---|---|---|---|---|
| Example No. | 14A | 14B | 14C | 14D | 14E | 14F | 14G | 14H | 14I | 14J |
| Antistat | None | Antistat B | | Antistat D | | Antistat E | | Antistat J | | Kemamine AS-974/1 |
| Type | Control | EO/PO | EO/PO | EO/PO | EO/PO | EO/PO | EO/PO | EO/EHGE | EO/EHGE | Amine |
| EO % | | 82 | 82 | 60 | 60 | 32 | 32 | 67 | 67 | — |
| Wt % | | 20 | 30 | 20 | 30 | 20 | 30 | 20 | 30 | 10 |
| Surface resistivity, ohm/sq. | 1.80 + 15 | 1.2E + 13 | 2.3E + 12 | 6.4E + 12 | 6.1E + 12 | 1.8E + 13 | 3.7E + 12 | 1.2E + 13 | 2.2E + 12 | 1.0E + 15 |
| Decay rate at 10%, sec. | Insulator | 0.70 | 0.02 | 0.34 | 0.02 | 0.41 | 0.20 | 0.46 | 0.07 | Insulator |
| Heat Distortion, ASTM D-648 °C. at 264 psi | 82 | 64 | 60 | 72 | 63 | 71 | 54 | 62 | 40 | — |
| Izod Impact, ASTM D-256 ft. lb./in of notch | 0.10 | 0.09 | 0.06 | 0.10 | 0.07 | 0.07 | 0.07 | 0.09 | 0.11 | — |
| Tensile, ASTM D-638 | | | | | | | | | | |
| Strength at break, psi × 1000 | 8.7 | 3.9 | 2.8 | 3.6 | 2.4 | 3.4 | 2.4 | 3.9 | 1.8 | — |
| Modulus, psi × 100,000 | 5.0 | 2.6 | 1.8 | 2.7 | 1.5 | 2.3 | 1.5 | 2.4 | 1.1 | — |
| % Elongation | 15.0 | 20.0 | 20.0 | 25.0 | 25.0 | n.d. | 15.0 | 15.0 | 65.0 | — |
| Durometer hardness, "D" ASTM D-2240 | 85 | 75 | 69 | 74 | 67 | 70 | 67 | 75 | 63 | — |

EXAMPLE 17

In this example, antistatic EO copolymer of this invention was examined with polycarbonate (PC). Lexan ® 141; obtained from General Electric Co. is an injection molding resin. Eighty-five parts of Lexan 141 was mixed with 15 parts of Antistat C at 225° C. The mixture gives a surface resistivity of $9.4 \times 10^{13}$ ohm/sq. Lexan 141 without antistat give a surface resistivity of greater than $10^{16}$ ohm/sq.

EXAMPLE 18

In this example, antistatic EO copolymer of this invention was examined with polyurethane (PUR). Estane ® 58130, a thermoplastic polyurethane, was obtained from BFGoodrich Co. Ninety parts of Estane 58130 was mixed with ten parts of Antistat A (EO/PO copolymer) at 210° C. The mixture gives a surface resistivity of $5.0 \times 10^{12}$ ohm/sq When ten parts of Antistat G (EO/DO copolymer) is incorporated, the mixture gives a surface resistivity of $3.1 \times 10^{13}$ ohm/sq.

EXAMPLE 19

In this example, antistatic EO copolymer of this invention was examined with a PVC compound for general purpose blow molding for bottles, etc. Geon ® 87444 is a commercial PVC compound available from The B.F.Goodrich Company useful for blow molding. To Geon ® 87444 was mixed 10 and 15 parts by weight Antistat C at 180° C. for 3 minutes. As shown in Table XVI, the EO copolymer of the present invention is an effective antistat additive for PVC blow molding compound.

TABLE XVI

Antistatic and Physical Properties of Antistatic PVC Compound of General Purpose Blow Molding

| | Example No. | | |
|---|---|---|---|
| | 19A | 19B | 19C |
| Antistat Type | Control | Antistat C EO/PO | Antistat C EO/PO |
| EO % | — | 77 | 77 |
| wt % | 0 | 10 | 15 |
| Surface Resistivity, ohm/sq | >1.0E + 15 | 4.2E + 11 | 1.2E + 11 |
| Decay rate at 10%, sec. | Insulator | 0.09 | 0.02 |
| Flexural Tests, ASTM D-790 | | | |
| Modulus, psi × 1000 | 362 | 301 | 258 |
| Strength, psi × 1000 Tensile | 10.5 | 6.5 | 4.6 |
| Strength at yield, 1000 × ps | 6.4 | 3.7 | 2.3 |
| Modulus, 100,000 × psi | 3.4 | 2.9 | 2.5 |
| Durometer Hardness | 86 | 75 | n.d. |

TABLE XVI-continued

Antistatic and Physical Properties of Antistatic PVC Compound of General Purpose Blow Molding

| | Example No. | | |
|---|---|---|---|
| | 19A | 19B | 19C |
| "D" ASTM D2240 | | | |

EXAMPLE 20

In this example, antistatic EO copolymer of this invention was examined with PVC compound of interior profile extrusion for vinyl blinds, etc. Geon ® 87408 is a commercial PVC compound available from BFGoodrich Co. for interior profile extrusion. The mixing of the PVC compound with Antistat C was carried out at 210° C. for two minutes. The PVC compound with 10 parts of Antistat C gives a surface resistivity of $5.7 \times 10^{11}$ ohm/sq and a decay rate (10% cut) of 0.32 sec. With 15 parts of Antistat C, the compound gives a surface resistivity of $2.2 \times 10^{11}$ ohm/sq and a decay rate (10% cut) of 0.08 sec. Without any antistat, the PVC compound gives a surface resistivity greater than $1.0 \times 10^{16}$ ohm/sq and is classified as an insulator by decay rate.

EXAMPLE 21

In this example, permanence of antistatic EO/PO copolymers of this invention was examined. Antistatic properties of several PVC compounds of Examples 2 and 7 were measured as a function of storage time. The results are shown in Table XVII.

In most cases, the surface resistivity does not change drastically as a function of storage time; with unknown reason, decay rate is improved.

TABLE XVII

| | | | | Storage Stability | | | |
|---|---|---|---|---|---|---|---|
| | Antistat | | Wt. % of | Surface Resistivity, ohm/Sq | | Decay Rate in Sec. (10% cut) | |
| Antistat | Type | EO wt. % | Antistat | Initial | Stored | Initial | Stored |
| After 15 months | | | | | | | |
| E | EO/PO | 54 | 10 | $2.1 \times 10^{11}$ | $2.7 \times 10^{12}$ | 0.11 | 0.12 |
| G | EO/DO | 75 | 10 | $2.9 \times 10^{13}$ | $6.9 \times 10^{13}$ | 1.11 | 0.78 |
| I | EO/BGE | 89 | 10 | $6.6 \times 10^{13}$ | $4.6 \times 10^{13}$ | 1.70 | 0.61 |
| After 10 months | | | | | | | |
| A | EO/PO | 85 | 7.5 | $4.8 \times 10^{12}$ | $7.0 \times 10^{12}$ | 0.57 | 0.22 |
| A | EO/PO | 85 | 10 | $3.0 \times 10^{12}$ | $6.3 \times 10^{12}$ | 0.15 | 0.06 |
| A | EO/PO | 85 | 15 | $2.3 \times 10^{13}$ | $5.9 \times 10^{11}$ | 0.03 | 0.01 |
| A | EO/PO | 85 | 20 | $2.8 \times 10^{11}$ | $1.4 \times 10^{11}$ | 0.02 | 0.01 |

Thus, it has been apparent that there has been provided, in accordance with the invention, an antistat that fully satisfies the objects, aims, and advantages set forth above. While the invention has been described in conjunction with specific embodiments thereof, it is evident that many alternatives, modification, and variations will be apparent to those skilled in the art in light of the foregoing description. Accordingly, the present invention is intended to embrace all such alternatives, modifications, and variations as fall within the spirit and scope of it.

What is claimed is:

1. An antistatic polymeric composition comprising:
   (a) at least one antistatic additive of an ethylene oxide copolymer in the range of from about 3 to about 30% by weight, said antistatic ethylene oxide copolymer being a solid, nonionic material having a dilution solution viscosity of greater than 0.;25 grams per milliliter as determined on a solution made up with 0.25 grams of the polymer in 100 grams of toluene according to ASTM D2857, said copolymer excluding epihalohydrin; and (b) a polymeric material, excluding olefins, selected from the class consisting of: copolymers of styrene and acrylonitrile; terpolymers of styrene, acrylonitrile and diene rubber; copolymers of styrene and acrylonitrile modified with acrylate elastomers; copolymers of styrene and acrylonitrile modified with ethylene propylene diene monomer rubber; polystyrene; rubber modified impact polystyrene; polycarbonates; thermoplastic polyesters; polyurethane; polyphenylene oxide; polyacetals; polymethyl methacrylate; and mixtures thereof in the range of from about 70 to about 97% by weight, wherein said ethylene oxide copolymer comprises (i) ethylene oxide in the range of from about 5 to about 95% by weight; and (ii) at least one cyclic comonomer represented by the formula:

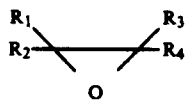

containing up to 25 carbon atoms, wherein $R_1$, $R_2$, $R_3$, and $R_4$ are selected from the group consisting of hydrogen, saturated aliphatic and cycloaliphatic, monoolefinic aliphatic and cycloaliphatic, diolefinic (conjugated and non-conjugated) aliphatic and cycloaliphatic, aromatic, aralkyl, and alkaryl groups, and wherein at least one of $R_1$, $R_2$, $R_3$, and $R_4$ is not hydrogen; said cyclic comonomer in the range of from about 95 to about 5% by weight of the total weight of said ethylene oxide copolymer, said ethylene oxide copolymer having a weight average molecular weight of from about 20,000 to about 5,000,000.

2. The composition of claim 1 wherein said ethylene oxide copolymer is a solid material at room temperature and has an inherent viscosity in the range from about 0.25 to about 15.0.

3. The composition of claim 2, wherein said cyclic comonomer is selected from the class consisting of propylene oxide; 1,2-butylene oxide; 1,2-dodecylene oxide; n-butyl glycidyl ether; 2-ethylhexylglycidyl ether; allyl glycidyl ether; cyclohexane oxide; and styrene oxide.

4. A process of preparing an antistatic polymeric composition comprising:

(a) adding a non-olefin polymeric material selected from the class consisting of: copolymers of styrene and acrylonitrile; terpolymers of styrene, acrylonitrile and diene rubber; copolymers of styrene and acrylonitrile modified with acrylate elastomers; copolymers of styrene and acrylonitrile modified with ethylene propylene diene monomer rubber; polystyrene; rubber modified impact polystyrene; polycarbonates; thermoplastic polyesters; polyurethane; polyphenylene oxide; polyacetals; polymethyl methacrylate; and mixtures thereof an effective amount of solid antistatic additive consisting of an ethylene oxide copolymer having a dilution solution viscosity of greater than 0.25 grams per milliliter as determined on a solution made up with 0.25 grams of the polymer in 100 grams of toluene according to ASTM D2857, said copolymer excluding epihalohydrin; and (b) mixing said polymeric material and said ethylene oxide copolymer to produce an antistatic polymeric composition, said ethylene oxide copolymer consisting essentially of:

(i) ethylene oxide in the range of from about 5 to about 95% by weight; and (ii) at least one cyclic comonomer represented by the formula:

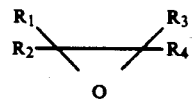

containing up to 25 carbon atoms, wherein $R_1$, $R_2$, $R_3$, and $R_4$ are selected from the group consisting of hydrogen, saturated aliphatic and cycloaliphatic, monoolefinic aliphatic and cycloaliphatic, diolefinic (conjugated and non-conjugated) aliphatic and cycloaliphatic, aromatic, and aralkyl, and alkaryl groups; and wherein at least one of $R_1$, $R_2$, $R_3$, and $R_4$ is not hydrogen; said cyclic comonomer in the range of from about 95 to about 5% by weight of the total weight of said ethylene oxide copolymer, said ethylene oxide copolymer having a weight average molecular weight of from about 20,000 to about 5,000,000.

5. The process of claim 4, wherein said ethylene oxide copolymer is in the range from about 3 to about 30% by weight of said antistatic polymeric composition, and said polymeric material is in the range from about 70 to about 97% by weight of said antistatic polymeric composition.

6. The process of claim 4, wherein said cyclic comonomer is selected from the class consisting of propylene oxide; 1,2-butylene oxide; 1,2-dodecylene oxide; n-butylglycidyl ether; 2-ethylhexylglycidyl ether; allylglycidyl ether; cyclohexane oxide; and styrene oxide.

* * * * *